United States Patent
Potter (10) Patent No.: US 6,750,590 B2
(45) Date of Patent: Jun. 15, 2004

(54) ELECTROSTATIC BASED POWER SOURCE AND METHOD THEREOF

(75) Inventor: Michael D. Potter, Churchville, NY (US)

(73) Assignee: Nth Tech Corporation, Churchville, NY (US)

( * ) Notice: Subject to any disclaimer, the term of this patent is extended or adjusted under 35 U.S.C. 154(b) by 0 days.

(21) Appl. No.: 10/280,304

(22) Filed: Oct. 24, 2002

(65) Prior Publication Data
US 2003/0081397 A1 May 1, 2003

Related U.S. Application Data
(60) Provisional application No. 60/338,163, filed on Oct. 26, 2001.

(51) Int. Cl.[7] .................................................. H02N 1/00
(52) U.S. Cl. .................................... 310/309; 322/2 A
(58) Field of Search ............................... 310/308, 309; 290/2 A, 2 R; 361/289, 290; 381/191

(56) References Cited

U.S. PATENT DOCUMENTS

| | | | | |
|---|---|---|---|---|
| 2,567,373 A | * | 9/1951 | Giacoletto | 322/2 R |
| 2,588,513 A | * | 3/1952 | Giacoletto | 310/309 |
| 3,405,334 A | * | 10/1968 | Jewett et al. | 310/309 |
| 4,288,735 A | * | 9/1981 | Crites | 290/2 A |
| 5,677,617 A | | 10/1997 | Tokai et al. | 323/222 |
| 6,127,812 A | | 10/2000 | Ghezzo et al. | 320/166 |
| 6,255,758 B1 | * | 7/2001 | Cabuz et al. | 310/309 |

FOREIGN PATENT DOCUMENTS

| | | | | |
|---|---|---|---|---|
| JP | 58-29379 | * | 2/1983 | H02N/1/00 |
| JP | 2-219478 | * | 9/1990 | H02N/11/00 |

\* cited by examiner

Primary Examiner—Karl Tamai
(74) Attorney, Agent, or Firm—Nixon Peabody LLP (57) ABSTRACT

A power system includes a housing with a chamber, a member with a stored static electrical charge, and a pair of electrodes. The member is connected to the housing and extends at least partially across the chamber. The electrodes are connected to the housing, are spaced from and on substantially opposing sides of the member from each other, and are at least partially in alignment with each other. The member is movable with respect to the pair of electrodes or one of the pair of electrodes is movable with respect to the member.

23 Claims, 9 Drawing Sheets

ELECTROSTATIC BASED POWER SOURCE AND METHOD THEREOF

The present invention claims the benefit of U.S. Provisional Patent Application Serial No. 60/338,163, filed Oct. 26, 2001, which is hereby incorporated by reference in its entirety.

FIELD OF THE INVENTION

This invention relates generally to power sources and, more particularly, to an electrostatic based power source and a methods thereof.

BACKGROUND OF THE INVENTION

There are a growing number of devices which require portable power sources. A variety of different types of portable power sources are available.

One of these types of portable power sources is batteries. For most applications batteries provide an adequate source of power. Unfortunately, batteries have finite lifetime and thus require periodic replacement.

Another type of portable power source are solar powered systems. Solar power systems also provide an adequate amount of power and provide a recharging mechanism. Unfortunately, the recharging mechanism requires solar radiation, which may not always be available and requires proper orientation to the solar radiation, which may not always be convenient.

SUMMARY OF THE INVENTION

A power system in accordance with one embodiment of the present invention includes a housing with a chamber, a member with a stored static electrical charge, and a pair of electrodes. The member is connected to the housing and extends at least partially across the chamber. The pair of electrodes are connected to the housing, are spaced from and on substantially opposing sides of the member from each other, and are at least partially in alignment with each other. The member is movable with respect to the pair of electrodes or one of the pair of electrodes is movable with respect to the member.

A method of making a power system in accordance with another embodiment of the present invention includes providing a housing with a chamber, providing a member with a stored static electrical charge, and providing a pair of electrodes connected to the housing. The member is connected to the housing and extends at least partially across the chamber. The pair of electrodes are spaced from and on substantially opposing sides of the member and are at least partially in alignment with each other. The member is movable with respect to the pair of electrodes or one of the pair of electrodes is movable with respect to the member.

A method for generating power in accordance with another embodiment of the present invention includes moving a member with a stored static electrical charge with respect to at least one of a pair of electrodes or one of the pair of electrodes with respect to the member, inducing a potential on the pair of electrodes as a result of the moving, and outputting the induced potential.

The present invention provides a power system which is compact, easy to use, and easy to incorporate in designs. This power system is renewable without requiring replacement of the system and without the need for solar radiation or proper orientation to solar radiation. Instead, the present invention is able to effectively extract energy, and hence power, from the sensor local environment. The environment may include local earth ambient, vibrational energy from machines or motion from animals or humans.

DETAILED DESCRIPTION

Figure 10:
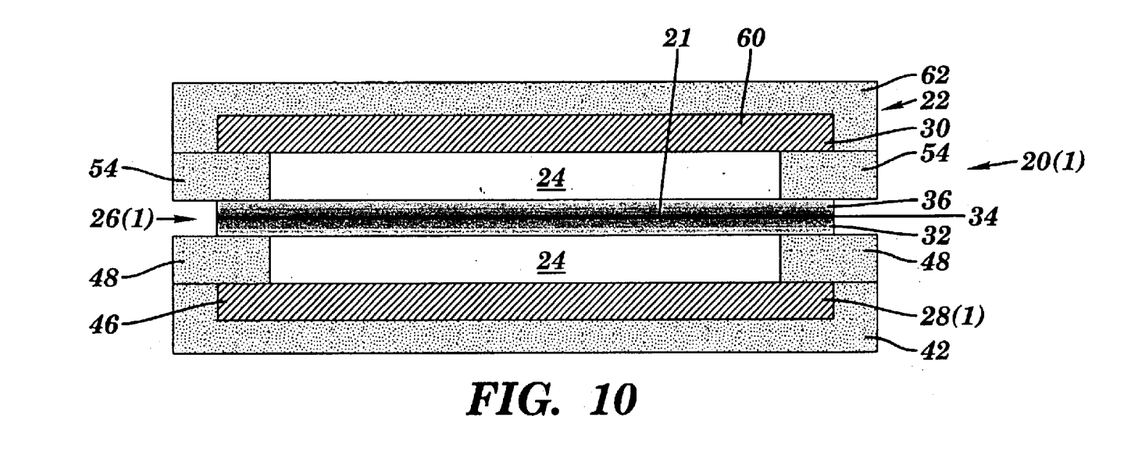
Figure 11:
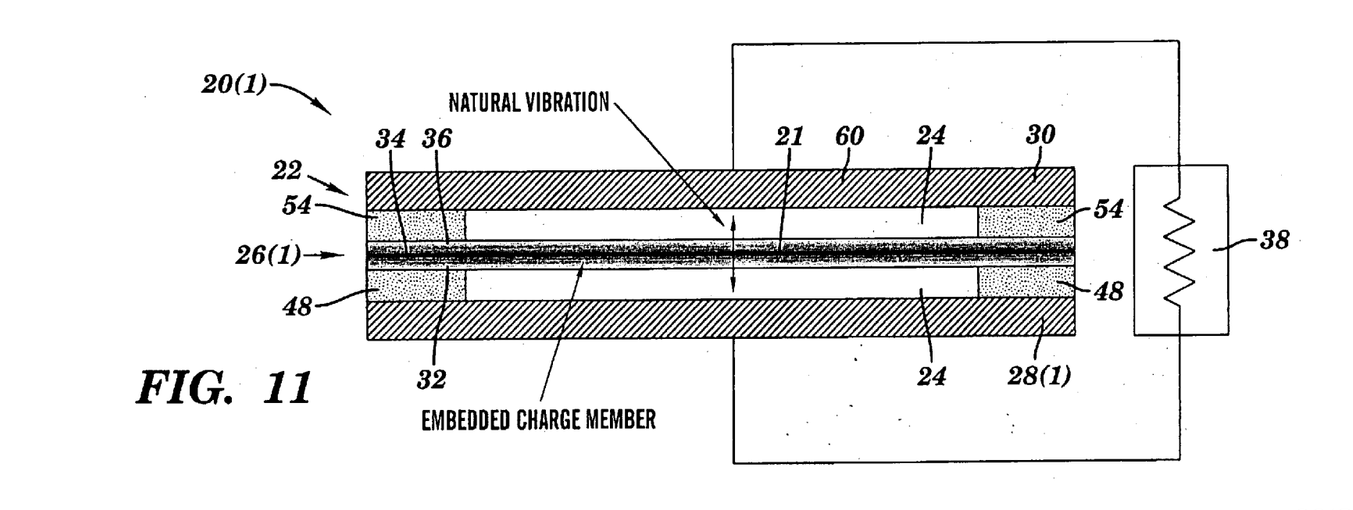
FIG. 11 is a side, cross-sectional view of the electrostatic power source shown in FIG. 10 coupled to a load.

A power system 20(1) in accordance with one embodiment of the present invention is illustrated in FIGS. 10 and 11. The power system 20(1) includes a housing 22 with a chamber 24, a member 26(1) with a stored static electrical charge 21, and a pair of electrodes 28(1) and 30. The present invention provides a power system 20(1) which is compact, easy to use, and easy to incorporate in designs.

Referring to FIGS. 10 and 11, the housing 22 has an internal chamber 24 and is made of a variety of layers, although other types of supporting structures in other configurations and other numbers of layers, such as one or more, made of other materials can be used. The size of the housing 22 and of the chamber 24 can vary as required by the particular application.

Figure 12:
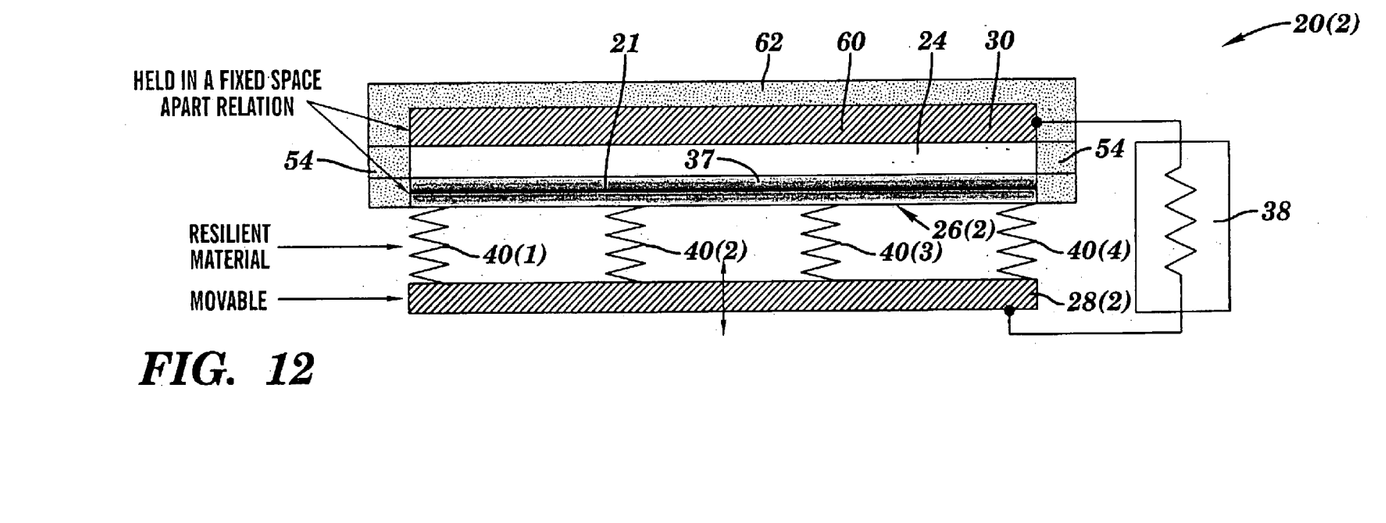
FIG. 12 is a side, cross-sectional view of an electrostatic power source with an electrode in accordance with another embodiment of the present invention.

The member 26(1) extends across the chamber 24 and is connected on opposing sides to an inner wall of the housing 22, although other arrangements can be used, such as having the member 26(1) secured at along one end or edge with the another end or edge space from the inner wall of the chamber 24 or connected on all sides or edges to the inner wall of the chamber 24 like a diaphragm. Each of the first and second electrodes 28(1) and 30 is initially spaced substantially the same distance from the member 26(1), although other configurations can be used. The chamber 24 is sealed with a fluid, such as air, although other types of fluids and/or materials can be used or the chamber or the chamber can be sealed in a vacuum. The position of the member 26(1) can be altered as a result of a movement of power system 20(1), although other configurations can be used, such as having the member 26(1) being fixed and one of the pair of electrodes 28(2) whose position can be altered as a result of a movement of power system 20(2) as shown in FIG. 12.

The member 26(1) can store a fixed static electrical charge 21, although member 26(1) can store other types of charge, such as a floating electrical charge. The member 26(1) has a pair of layers 32 and 36 of dielectric material, such as silicon oxide, silicon dioxide, silicon nitride, aluminum oxide, tantalum oxide, tantalum pentoxide, titanium oxide, titanium dioxide, barium strontium titanium oxide, although other types of materials which can hold a charge and other numbers of layers, such as a member 26(2) with one layer 37 as shown in FIG. 12 or three or more layers can be used. The layers 32 and 36 are seated against each other along an interface 34 were the static electrical charge 21 is stored. The member 26(1) can hold a fixed charge 21 on the order of at least $1 \times 10^{10}$ charges/cm².

The pair of electrodes 28(1) and 30 are located in the inner walls of the housing 22 in chamber 24, although other configurations for connecting the pair of electrodes 28(1) and 30 to the housing 22 can be used, such as having each of the first and second electrodes 28(1) and 30 located in the inner wall of the housing 22 and spaced from the chamber 24 by one or more layers of material, such as an insulating material, or by having each of the first and second electrodes 28(1) and 30 seated on the inner walls of the housing 22 in the chamber 24. The first and second electrodes 28(1) and 30 are in substantial alignment with each other and are spaced from and located on a substantially opposing sides of the member 26(1), although other configurations can be used. By way of example only, the distance between each of the pair of electrodes 28(1) and 30 is about 1.0 microns, although this distance can vary. Depending on the material and/or fluid in the chamber 24, such as air or a vacuum, the electrodes 28(1) and 30 will be spaced different distances from the member 26(1). In this particular embodiment, this spacing is determined so that the electrodes 28(1) and 30 with respect to the member 26(1) have equal amounts of induced electrical charge at an initial state, although other arrangements can be used.

A load 38, such as a cell phone or a pager, is coupled to the pair of electrodes 28(1) and 30, although other types of devices can be coupled to the electrodes 28(1) and 30, such as a device which uses and/or stores the generated power.

Referring to FIG. 12, a power system 20(2) in accordance with another embodiment is shown. Elements in FIG. 12 which are like elements shown and described in FIGS. 1–11 will have like numbers and will not be shown and described in detail again here. The member 26(2) comprises a single layer 37 of dielectric material, such as silicon oxide, silicon dioxide, silicon nitride, aluminum oxide, tantalum oxide, tantalum pentoxide, titanium oxide, titanium dioxide, barium strontium titanium oxide, in which the static electrical charge 21 is held, although the member 26(2) can have other numbers of layers. The member 26(2) extends across the chamber 24 and is connected on opposing sides to an inner wall of the housing 22, although other arrangements can be used, such as having the member 26(2) secured at along one end or edge with the another end or edge space from the inner wall of the chamber 24. The position of one of the pair of electrodes 30 with respect to the member 26(2) is fixed and the position of the other one of the electrodes 28(2) with respect to the member 20(2) can be altered as a result of a movement of power system 20(2), although other configurations can be used. The space in chamber 24 between member 26(2) and electrode 30 is filled with a layer of dielectric material, although the space could be filled with other fluids and/or materials, such as air or a vacuum could be used.

A resilient device 40, such as a spring or a resilient material, is provided between the member 26(2) and the electrode 28(2), although the space between the member 26(2) and electrodes 28(2) and 30 can be filled with other types of resilient devices or materials. The resilient device 40 is used to move the electrode 28(2) back to an initial position when the electrode 28(2) has been moved as a result of some other movement.

By way of example only, the power system 20(2) could be incorporated in a variety of devices, such as in a heel of a boot. The electrode 28(1) may be located in the sole of the boot and would be pushed towards the member 26(1) every time a step was taken. When the sole of the boot was lifted off the ground, then the resilient devices 40(1)–40(4) would push the electrode 28(1) back away from the electrode 26(1). As a result, the power system 20(2) could generate power as someone was walking for a variety of different types of devices.

Figure 13:
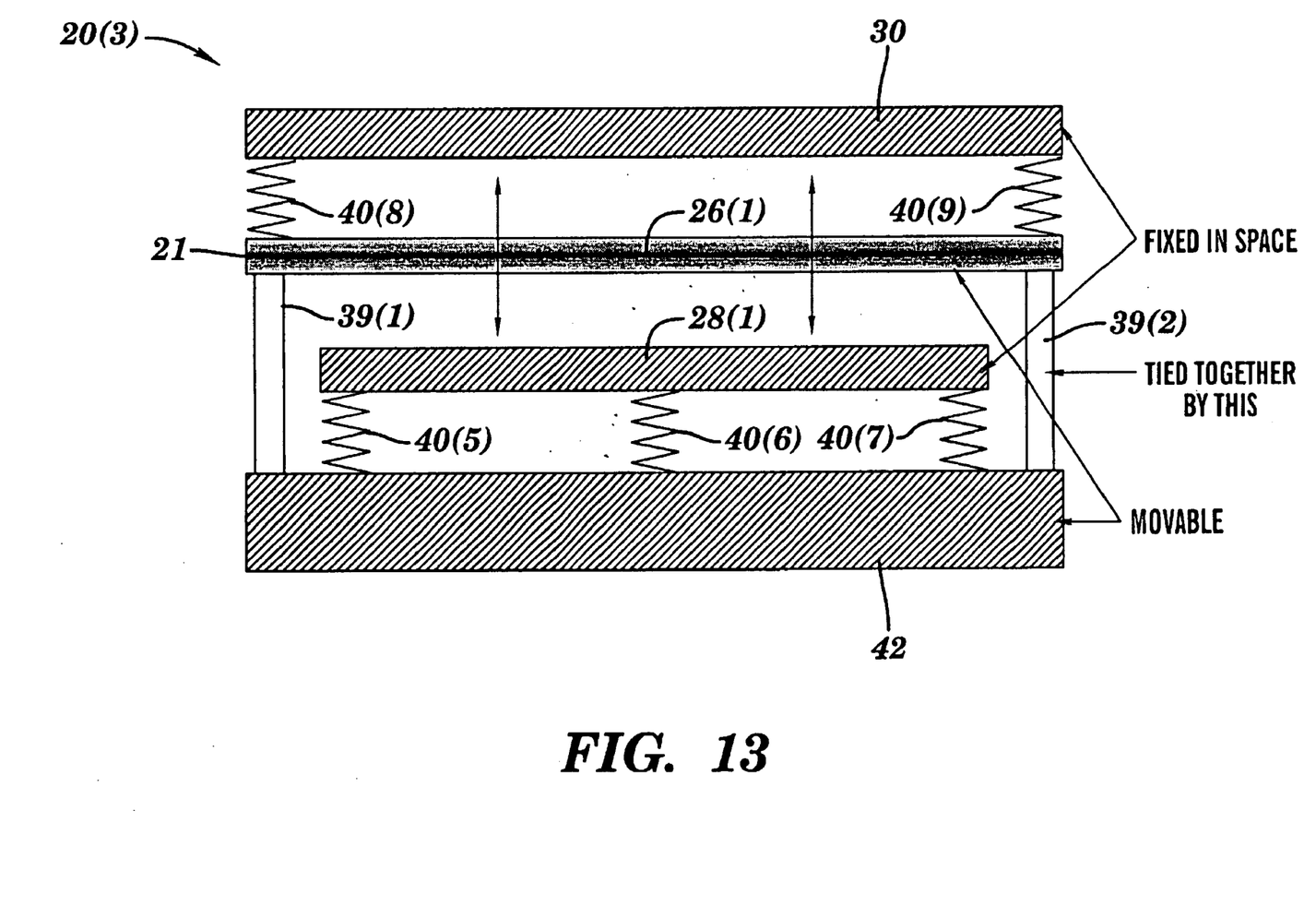
FIG. 13 is a side, cross-sectional view of an electrostatic power source with a movable member and base in accordance with another embodiment of the present invention.

Referring to FIG. 13, a power system 20(3) in accordance with another embodiment is shown. Elements in FIG. 13 which are like elements shown and described in FIGS. 1–11 will have like numbers and will not be shown and described in detail again here. In this particular embodiment, the electrodes 28(1) and 30 are connected to the housing 22, member 26(1) is connected to a substrate 42 with supports 39(1) and 39(2), resilient devices 40(5)–40(7), such as springs, are coupled between electrode 28(1) and substrate 30, and resilient devices 40(8) and 40(9), such as springs, are connected between electrode 30 and member 26(1), although other configurations, materials, and devices can be used.

Figure 14:
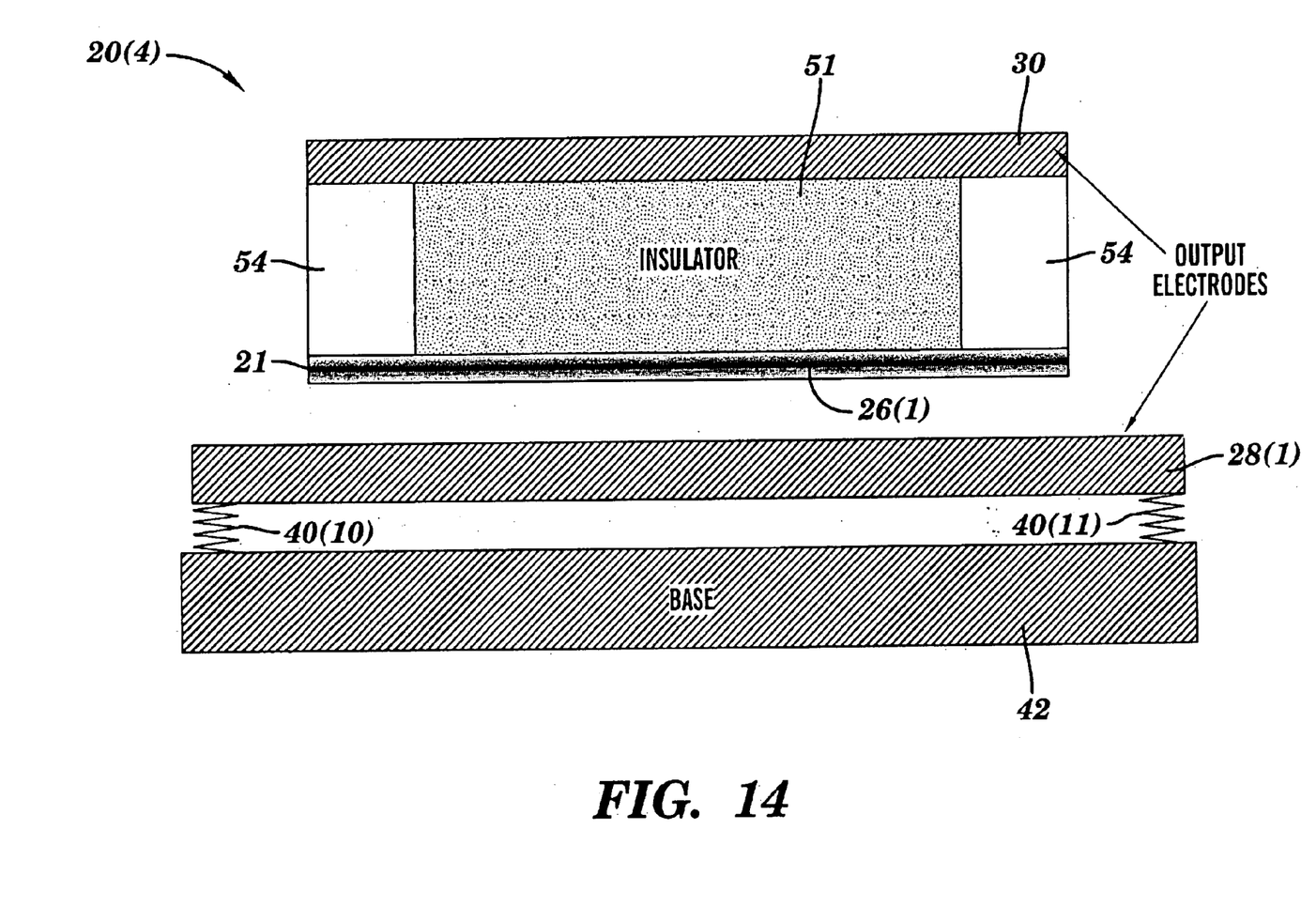
FIG. 14 is a side, cross-sectional view of an electrostatic power source with a movable member and base in accordance with another embodiment of the present invention.

Referring to FIG. 14, a power system 20(4) in accordance with another embodiment is shown. Elements in FIG. 14 which are like elements shown and described in FIGS. 1–11 will have like numbers and will not be shown and described in detail again here. In this particular embodiment, an insulating material 51 is between and connects electrode 30 and member 26(1) and resilient devices 40(10) and 40(11) are coupled between electrode 30 and substrate 42, although other configurations, materials, and devices can be used.

Figure 15:
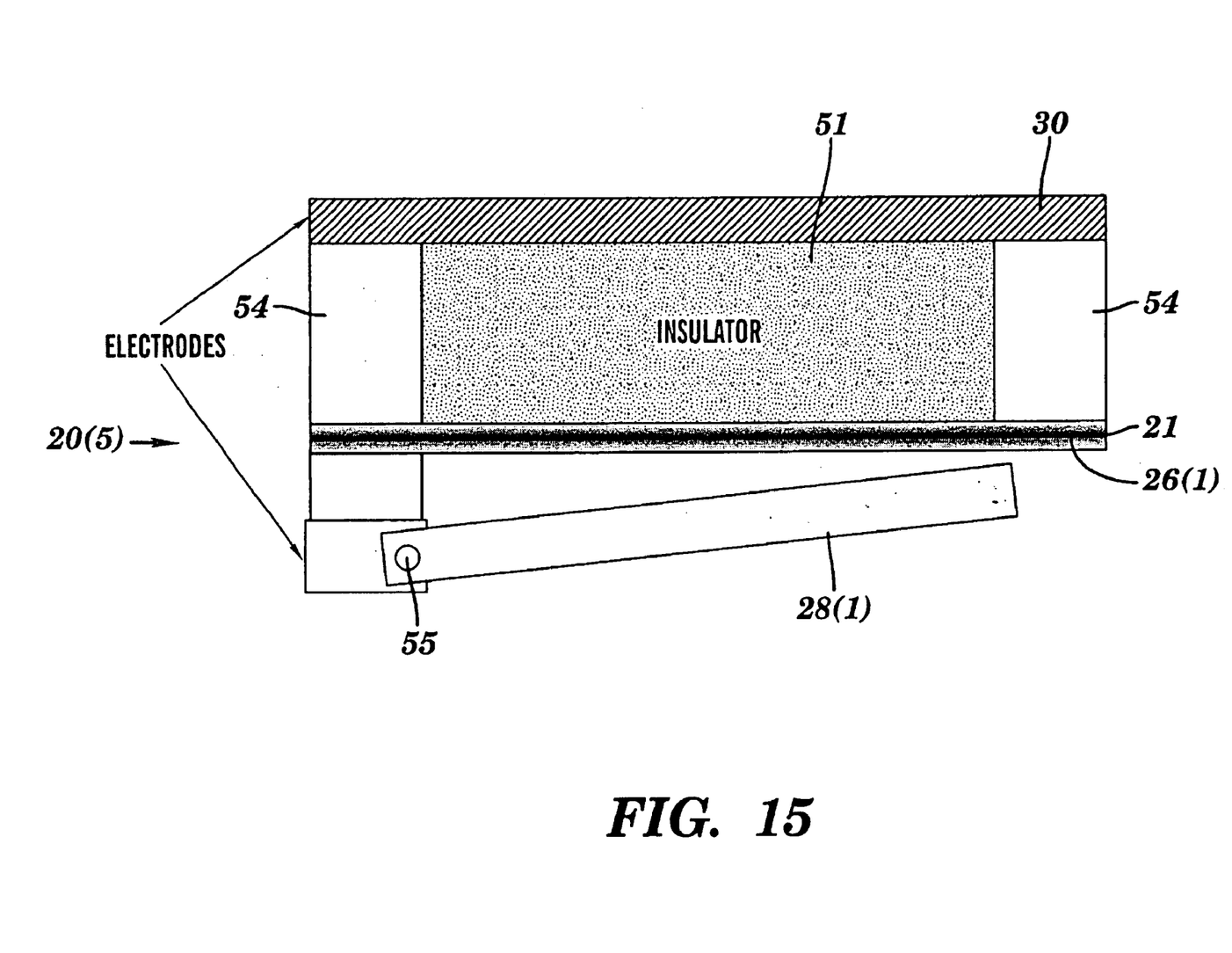
FIG. 15 is a side, cross-sectional view of an electrostatic power source with a movable member and base in accordance with another embodiment of the present invention.

Referring to FIG. 15, a power system 20(5) in accordance with another embodiment is shown. Elements in FIG. 15 which are like elements shown and described in FIGS. 1–11 will have like numbers and will not be shown and described in detail again here. In this particular embodiment, an insulating material 51 is between electrode 30 and member 26(1) and at one end the member is pivotally connected at a pivotal connection 55 to the housing 22, although other configurations, materials, and devices can be used.

Figure 1:
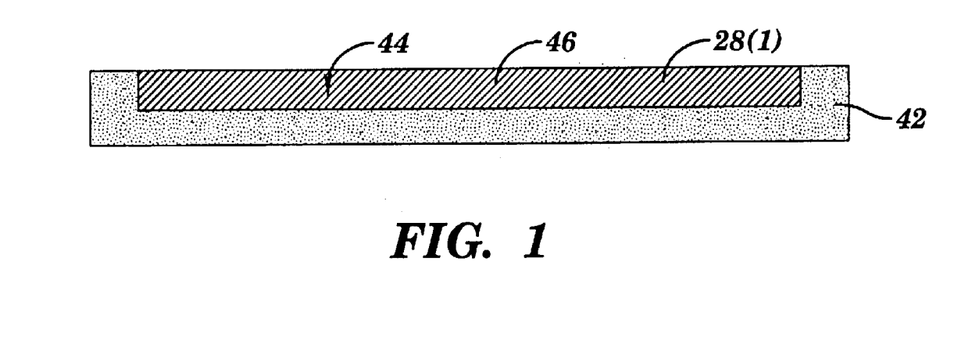
FIGS. 1–10 are side, cross-sectional view of a method for making an electrostatic power source in accordance with one embodiment of the present invention.

A method for making a power system 20(1) in accordance with one embodiment of the present invention is described below with reference to FIGS. 1–11. To make a power system 20(1) a suitable substrate 42, such as silicon oxide on silicon, is provided as shown in FIG. 1, although other types of materials could be used. A first trench 44 is formed in the substrate 42 and the first trench 44 is filled with a first conductive layer 46, such as aluminum, although other types of materials could be used. The first conductive layer 46 may be planarized so that only the first trench 44 is filled with the first conductive layer 46. By way of example, this may be done by standard chemical mechanical planarization (CMP) processing, although other techniques can be used. The resulting first conductive layer 46 in the first trench 44 forms the first electrode 28(1).

Figure 2:
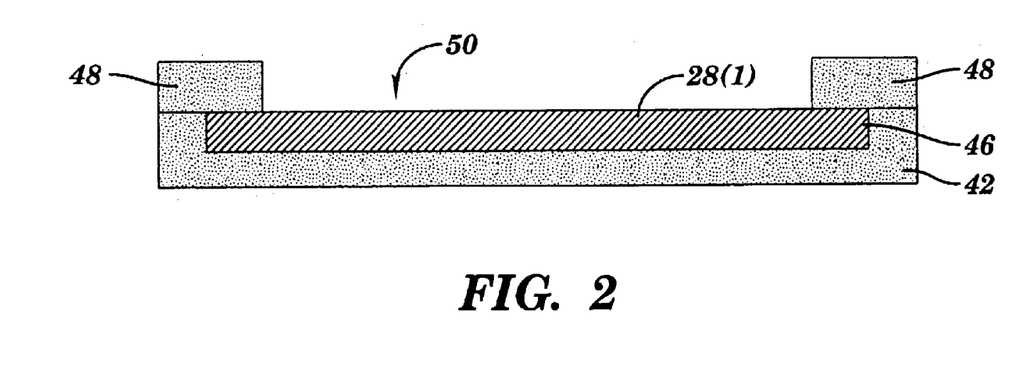

Referring to FIG. 2, a first insulating layer 48, such as silicon dioxide, is deposited on the first conductive layer 46 and a portion of the substrate 42, although other types of materials could be used. A second trench 50 is formed in the first insulating layer 48 which is at least in partial alignment with the first electrode 28(1). The second trench 50 is etched to the surface of the first electrode 28(1), although other configurations can be used, such as leaving a portion of the first insulating layer 48 over the first electrode 28(1).

Figure 3:
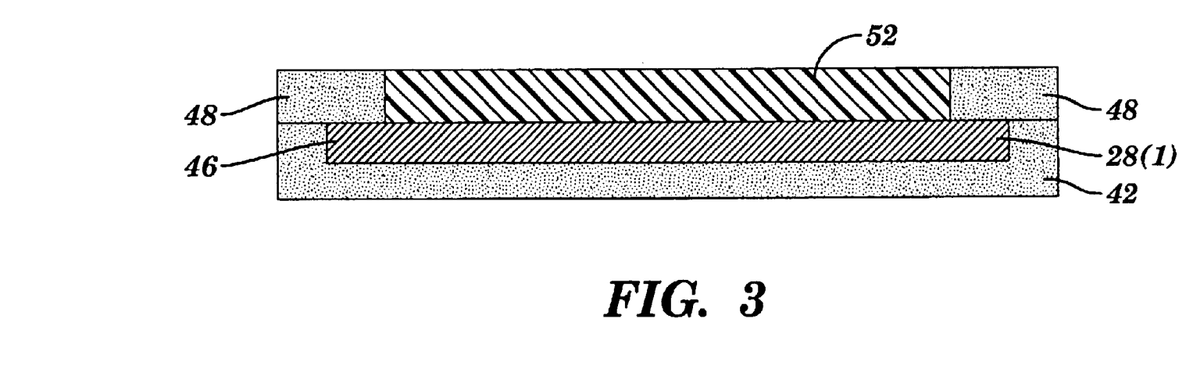

Referring to FIG. 3, the second trench 50 is filled with a first sacrificial layer 52, such as polysilicon, although other types of materials can be used, and the first sacrificial layer 52 may be planarized. By way of example, the planarizing of the first sacrificial layer 52 may be done by standard CMP processing, although other techniques can be used.

Figure 4:
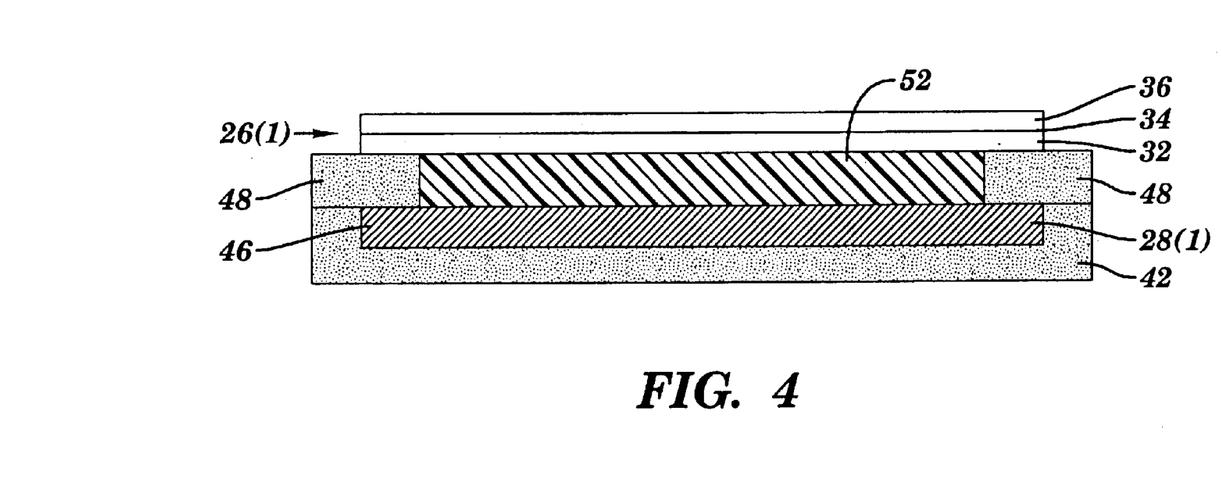

Referring to FIG. 4, a member 26(1) which can store a fixed electronic charge is deposited on a portion of the first insulating layer 48 and the first sacrificial material 52. The member 26(1) has two layers 32 and 36 of insulating material, such as silicon oxide and silicon nitride, and silicon oxide and aluminum oxide, and an interface 34 between the layers 32 and 36, although other combination of materials that can store fixed charge can be deposited as the member 26(1) and other numbers of layers can be used. Additionally, the member 26(1) may comprise other numbers of layers of material, such as a member 26(2) with a single layer 37 shown in FIG. 12 or multiple layers. For example, a tri-layer of silicon oxide-silicon nitride-silicon oxide may be used. The member 26(1) can move towards and away from the first electrode 28(1) and the second electrode 30, although other arrangements can be used, such as shown in FIG. 12 where the member 26(2) is fixed with respect to one of the electrodes 30 and one of the electrodes 28(2) can move with respect to member 26(2) and the other electrode 30.

Figure 5:
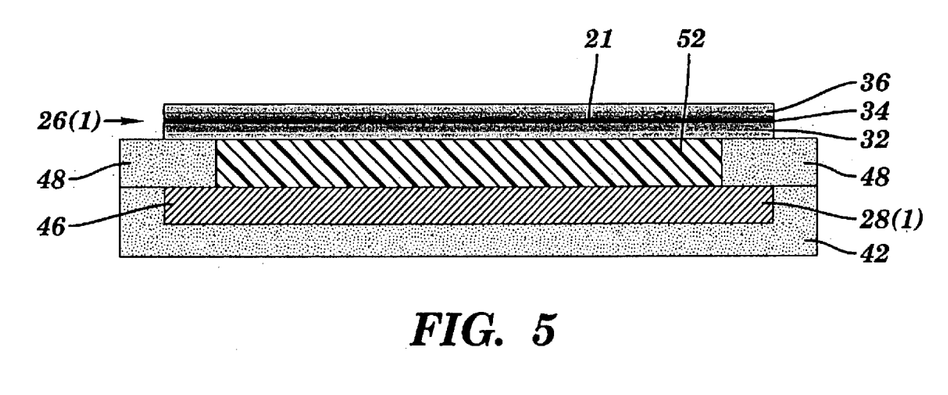

Referring to FIG. 5, electronic charge 21 is injected into the member 26(1). A variety of techniques for injecting charge 21 can be used, such as a low to medium energy ballistic electron source or by utilizing a sacrificial conductive layer (not shown) disposed on top of the member 26(1) and subsequently applying an electric field sufficient to inject electrons into the member 26(1).

Figure 6:
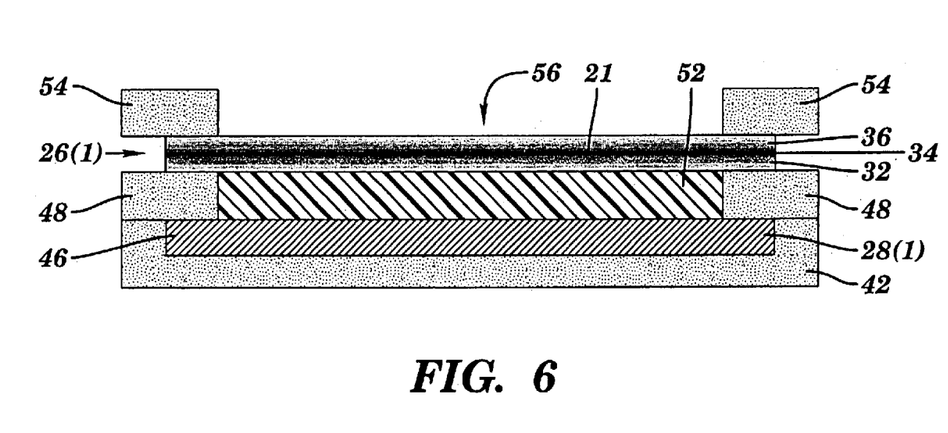

Referring to FIG. 6, a second insulating layer 54, such as silicon dioxide, is deposited on the member 26(1), although other types of materials can be used. Next, a third trench 56 is etched in the second insulating layer 54 to the member 26(1), although the third trench 56 can be etched to other depths. The third trench 56 is in substantial alignment with the second trench 50, although other arrangements can be used as long as the third trench 56 is at least in partial alignment with the second trench 50.

Figure 7:
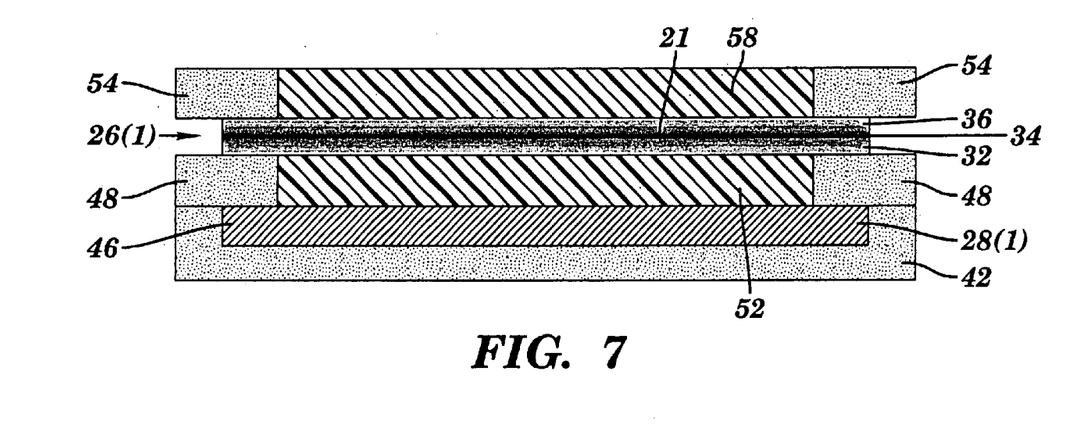

Referring to FIG. 7, the third trench 56 is filled with a second sacrificial material 58, such as polysilicon, although other types of material can be used. The second sacrificial material 58 may be planarized.

Figure 8:
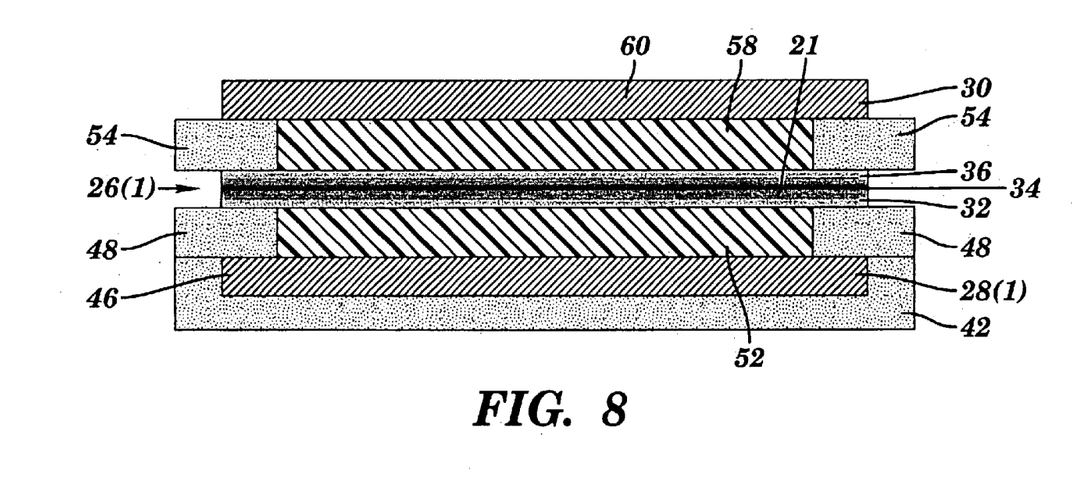

Referring to FIG. 8, a second conductive layer 60, such as aluminum, is deposited on at least a portion of the second insulating layer 54 and the second sacrificial material 58, although other types of materials can be used. The second conductive layer 60 forms the second electrode 30 in this embodiment.

Figure 9:
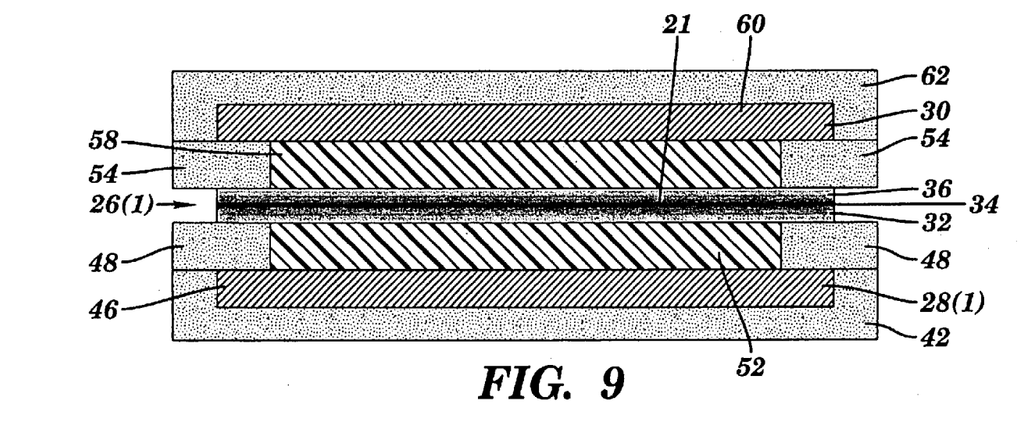

Referring to FIG. 9, a third insulating layer 62, such as silicon dioxide, is deposited over at least a portion of the second insulating layer 54 and the second electrode 30 to encapsulate the second electrode 30, although other types of materials can be used.

Next, holes or vias (not shown) are etched to the first and second electrodes 28(1) and 30 to provide contact points and are also etched to provide access to the first and second sacrificial layers 52 and 58. The first and second sacrificial materials 52 and 58 are removed through the hole(s). A variety of techniques can be used to remove the sacrificial materials 52 and 58. For example, if the sacrificial material is polysilicon, the etchant may be xenon difluoride. Removing the first sacrificial material 52 forms a first compartment and removing the second sacrificial material 58 forms a second compartment in chamber 24. The chamber 24 with first and compartment may be filled with a variety of different types of fluids and/or materials, such as air or may be in a vacuum.

Referring to FIGS. 10 and 11, the resulting power system 20(1) is shown. A load 38 is coupled to the first and second electrodes 28(1) and 30, although other types of devices could be coupled to the electrodes 28(1) and 30.

The method for making the power system 20(2) shown in FIG. 12 is the same as the method described for making the power system 20(2) as described with reference to FIGS. 1–11, except as described below. In this particular embodiment, in FIG. 3 the second trench 50 is filled with a first resilient layer 60, such as a foam, although other numbers of layers and other materials and/or fluids could be used and the second trench may also be filled with other types of devices, such as one or more mechanical springs. The first resistant layer 60 is etched to form resilient devices 62(1)–62(4), although the resilient devices can be formed in other manners, such as by inserting mechanical springs in the second trench 50. The trenches or openings between the resilient devices 62(1)–62(4) is filled with the first sacrificial material 52 and may be planarized, although other types of materials could be used. By way of example, the planarizing of the first sacrificial layer 52 may be done by standard CMP processing, although other techniques can be used.

Additionally in the embodiment shown in FIG. 12, a member 26(2) which can store a fixed electronic charge 21 is deposited on a portion of the first insulating layer 48 and the first sacrificial material 52. In this particular embodiment, the member 26(2) comprises a single layer 37 that can store fixed charge, although member 26(2) may comprise other numbers of layers of material. In this particular embodiment, the member 26(2) is fixed with respect to one of the electrodes 30.

Further, in this particular embodiment, the substrate 42 is removed from the first electrode 28(2). The first electrode 28(2) can move to member 26(2) and the other electrode 30.

The method for making the power system 20(3) shown in FIG. 13 is the same as the method described for making the power system 20(1) as described with reference to FIGS. 1–11, except as described below. In this particular embodiment, supports 39(1) and 39(2) are placed between member 26(1) and substrate 42, resilient devices 40(5)–40(7) are placed between electrode 28(1) and substrate 30, and resilient devices 40(8) and 40(9) are placed between electrode 30 and member 26(1), although other configurations, materials, and devices can be used.

The method for making the power system 20(4) shown in FIG. 14 is the same as the method described for making the power system 20(1) as described with reference to FIGS. 1–1, except as described below. In this particular embodiment, an insulating material 51 is placed between electrode 30 and member 26(1) in chamber 24 and resilient devices 40(10) and 40(11) are placed between and connect electrode 30 and substrate 42, although other configurations, materials, and devices can be used.

The method for making the power system 20(5) shown in FIG. 15 is the same as the method described for making the power system 20(1) as described with reference to FIGS. 1–11, except as described below. In this particular embodiment, an insulating material 51 is placed between and connects electrode 30 and member 26(1) and electrode 28(1) is pivotally connected at one end to the housing 22, although other configurations, materials, and devices can be used.

The operation of the power system 20(1) in accordance with one embodiment will be described with reference to FIGS. 10 and 11. In this particular embodiment, the member 26(1) has a natural resonant frequency. Any vibrational or shock input, such as from the local environment, will cause the member 26(1) to oscillate. When the member 26(1) is nearest to the first electrode 28(1), the portion of induced opposite sign charge on the first electrode 28(1) will be greater than on the second electrode 30. When the member 26(1) is nearest the second electrode 30, the induced opposite sign charge on the second electrode 30 will be greater than on the first electrode 28(1). When the first and second electrodes 28(1) and 30 are connected to a load 38, useful energy can be extracted as the charge-storing member oscillates. By way of example only, if the power system 20(1) was in a shoe, then as the wearer of the shoe walked or moved the vibrations would be converted to useful energy that could be output to power a load 38.

The output from the first and second electrodes 28(1) and 30 may be post processed if desired. For example, if the time varying potential is to be used to charge a capacitor, a rectifying system together with a diode may be chosen that will break down above the output potential difference level, thus allowing charging of the capacitor, but not discharging back through the system. In another application, a voltage regulator may be used to process the time varying potential difference. In still another application, a full wave rectifier may be used to convert the time varying potential difference to direct current. Also, other components, such as capacitors, may be used to smooth DC voltage ripples in the generated power.

The operation of the power system 20(2) is the same as that for the power system 20(1), except as described herein. The member 26(2) is fixed with respect to the electrode 30 and the electrode 28(2) can be moved toward and away from member 26(2), although other configurations are possible. Any vibrational input, such as from the local environment, will cause the member electrode 28(2) to oscillate or move. The resilient devices are used to control the oscillation of the electrode 28(2) and when the vibrational input stops, eventually returns the electrode 28(2) to its initial state. When the member 26(2) is nearest to the first electrode 28(2), the portion of induced opposite sign charge on the first electrode 28(2) will be greater than on the second electrode 30. When the member 26(2) is nearest the second electrode 30, the induced opposite sign charge on the second electrode 30 will be greater than on the first electrode 28(2). When the first and second electrodes 28(2) and 30 are connected to a load 38, useful energy can be extracted as the electrode 28(2) moves with respect to member 26(2).

The operation of the power system 20(3) shown in FIG. 13 is the same as that for the power system 20(1), except as described herein. With the resilient devices 40(5)–40(9), the member 26(1) and the substrate 42 are movable with respect to the electrodes 28(1) and 30, although other ways of moving member 26(1) and electrodes 28(1) and 30 with respect to each other can be used. Any vibrational input will cause member 26(1) and substrate 42 to oscillate or move which generates a potential difference on electrodes 28(1) and 30 that can be extracted as useful energy as described in greater detail above with reference to power systems 20(1) and 20(2).

The operation of the power system 20(4) shown in FIG. 14 is the same as that for the power system 20(1), except as described herein. With the resilient devices 40(10)–40(11), the electrode 28(1) is movable with respect to the member 26(1) and substrate 42, although other ways of moving member 26(1) and electrodes 28(1) and 30 with respect to each other can be used. Any vibrational input will cause electrode 28(1) to oscillate or move which generates a potential difference on electrodes 28(1) and 30 that can be extracted as useful energy as described in greater detail above with reference to power systems 20(1) and 20(2).

Referring to FIG. 15, a power system 20(5) in accordance with another embodiment is shown. Elements in FIG. 15 which are like elements shown and described in FIGS. 1–11 will have like numbers and will not be shown and described in detail again here. With pivotal connection, electrode 28(1) can pivot towards and away from member 26(1), although other ways of moving member 26(1) and electrodes 28(1) and 30 with respect to each other can be used. Any vibrational input will cause electrode 28(1) to oscillate or move which generates a potential difference on electrodes 28(1) and 30 which can be extracted as useful energy as described in greater detail above with reference to power systems 20(1) and 20(2).

Accordingly, the present invention is directed to a self renewing power source or supply. The present invention uses embedded static charge in a member in a resonating or otherwise moving structure to provide a power source for devices. Energy is effectively extracted from the local environment from a displacement current caused by the embedded charge member's and/or one of the electrodes movement due to natural vibrations or shocks from the local surroundings. No human intervention is required for the life of the remote sensor.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A power system comprising:

a housing with a chamber;

a non-conducting member with a stored static electrical charge, the member is connected to the housing and extends at least partially across the chamber; and a pair of electrodes connected to the housing, the pair of electrodes are spaced from and on substantially opposing sides of the non-conducting member from each other and are at least partially in alignment with each other, wherein at least one of the member and one of the pair of electrodes is connected to the housing so that the wherein at least one of the non-conducting member and one of the pair of electrodes is movable with respect to the other in response to a vibrational input;

wherein the member is held in a fixed, spaced apart relationship with respect to one of the pair of electrodes, the other one of the pair of electrodes is movable with respect to the member and the one of the pair of electrodes.

2. The system as set forth in claim 1 wherein the pair of electrodes are held in a fixed spaced apart relationship and at least a portion of the member is movable with respect to the pair of electrodes.

3. The system as set forth in claim 2 wherein the member is connected by at least one resilient device to one of the pair of electrodes, the member is movable with respect to the one of the pair of electrodes.

4. A power system comprising:
a housing with a chamber:
a non-conducting member with a stored static electrical charge, the member is connected to the housing and extends at least partially across the chamber; and
a pair of electrodes connected to the housing, the pair of electrodes are spaced from and on substantially opposing sides of the non-conducting member from each other and are at least partially in alignment with each other, wherein at least one of the member and one of the pair of electrodes is connected to the housing so that the wherein at least one of the non-conducting member and one of the pair of electrodes is movable with respect to the other in response to a vibrational input
wherein the pair of electrodes are held in a fixed spaced apart relationship and at least a portion of the member is movable with respect to the pair of
wherein the member is connected to a movable base, at least one first resilient device is connected between the movable base and one of the pair of electrodes, and at least one second resilient device connected between the member the other one of the pair of electrodes.

5. The system as set forth in claim 1 wherein the other one of the pair of electrodes is connected by at least one resilient device to a base.

6. The system as set forth in claim 1 wherein one end of the other one of the pair of electrodes is pivotally connected to the housing.

7. The system as set forth in claim 1 further comprising a load coupled to the pair of electrodes.

8. The system as set forth in claim 1 wherein the member comprises two or more dielectric layers.

9. The system as set forth in claim 1 wherein the member comprises a single dielectric layer.

10. The system as set forth in claim 1 wherein the member is made from one or more materials selected from a group consisting of silicon oxide, silicon dioxide, silicon nitride, aluminum oxide, tantalum oxide, tantalum pentoxide, titanium oxide, titanium dioxide, barium strontium titanium oxide.

11. A method of making a power system, the method comprising:
providing a housing with a chamber,
providing a non-conducting member with a stored static electrical charge, the non-conducting member connected to the housing and extending at least partially across the chamber; and
providing a pair of electrodes connected to the housing, the pair of electrodes are spaced from and on substantially opposing sides of the non-conducting member from each other and are at least partially in alignment with each other, wherein the non-conducting member is movable with respect to the pair of electrodes or one of the pair of electrodes is movable with respect to the non-conducting member;
wherein the member is held in a fixed, spaced apart relationship with respect to one of the pair of electrodes, the other one of the pair of electrodes is movable with respect to the member and the one of the pair of electrodes.

12. The method as set forth in claim 11 wherein the pair of electrodes are held in a fixed spaced apart relationship and at least a portion of the member is movable with respect to the pair of electrodes.

13. The method as set forth in claim 12 wherein the member is connected by at least one resilient device to one of the pair of electrodes, the member is movable with respect to the one of the pair of electrodes.

14. A method of making a power system, the method comprising:
providing a housing with a chamber
providing a non-conducting member with a stored static electrical charge, the non-conducting member connected to the housing and extending at least partially across the chamber; and
providing a pair of electrodes connected to the housing, the pair of electrodes are spaced from and on substantially opposing sides of the non-conducting member from each other and are at least partially in alignment with each other, wherein the non-conducting member is movable with respect to the pair of electrodes or one of the pair of electrodes is movable with respect to the non-conducting member;
wherein the pair of electrodes are held in a fixed spaced apart relationship and at least a portion of the member is movable with respect to the pair of electrodes;
wherein the member is connected to a movable base, at least one first resilient device is connected between movable base and one of the pair of electrodes, and at least one second resilient device connected between the member the other one of the pair of electrodes.

15. The method as set forth in claim 11 wherein the other one of the pair of electrodes is connected by at least one resilient device to a base.

16. The method as set forth in claim 11 wherein one end of the other one of the pair of electrodes is pivotally connected to the housing.

17. The method as set forth in claim 11 further comprising providing a load coupled to the pair of electrodes.

18. The method as set forth in claim 11 wherein the member comprises two or more dielectric layers.

19. The method as set forth in claim 11 wherein the member comprises a single dielectric layer.

20. The method as set forth in claim 11 wherein the member is made from one or more materials selected from a group consisting of silicon oxide, silicon dioxide, silicon nitride, aluminum oxide, tantalum oxide, tantalum pentoxide, titanium oxide, titanium dioxide, barium strontium titanium oxide.

21. A method for generating power, the method comprising:
moving a non-conducting member with a stored static electrical charge with respect to at least one of a pair of electrodes or one of the pair of electrodes with respect to the non-conducting member, wherein the member is held in a fixed, spaced apart relationship with respect to one of the pair of electrodes, the other one of the pair of electrodes is movable with respect to the member and the one of the pair of electrodes;
inducing a potential on the pair of electrodes as a result of the moving; and
outputting the induced potential.

22. The method as set forth in claim 21 further comprising storing the outputted induced potential.

23. The method as set forth in claim 21 further comprising returning at least one of the member and one of the pair of electrodes towards an initial resting state after the moving with the resilient device.

* * * * *